(12) United States Patent
Krishnamoorthy et al.

(10) Patent No.: US 7,870,133 B2
(45) Date of Patent: Jan. 11, 2011

(54) METHOD FOR SEMANTIC BASED STORAGE AND RETRIEVAL OF INFORMATION

(75) Inventors: Srikumar Krishnamoorthy, Chennai (IN); Abdul Sakib Mondal, Bangalore (IN)

(73) Assignee: Infosys Technologies Ltd. (IN)

( * ) Notice: Subject to any disclaimer, the term of this patent is extended or adjusted under 35 U.S.C. 154(b) by 355 days.

(21) Appl. No.: 12/074,870

(22) Filed: Mar. 6, 2008

(65) Prior Publication Data

US 2009/0182730 A1    Jul. 16, 2009

(30) Foreign Application Priority Data

Jan. 14, 2008    (IN)    ........................ 125/CHE/2008

(51) Int. Cl.
  *G06F 7/00*    (2006.01)
  *G06F 17/30*    (2006.01)
(52) U.S. Cl. ....................... 707/736; 707/747
(58) Field of Classification Search ............... 707/797, 707/711, 736, 737, 747, 749; 704/2, 4, 8, 704/9; 709/224, 204, 243, 239
See application file for complete search history.

(56) References Cited

U.S. PATENT DOCUMENTS

| | | | |
|---|---|---|---|
| 6,006,221 A * | 12/1999 | Liddy et al. ...................... 1/1 |
| 6,847,966 B1 * | 1/2005 | Sommer et al. ............. 707/739 |
| 7,039,634 B2 * | 5/2006 | Xu et al. ............................. 1/1 |
| 7,043,470 B2 | 5/2006 | Xu et al. |
| 7,483,892 B1 * | 1/2009 | Sommer et al. ..................... 1/1 |
| 2004/0054807 A1 | 3/2004 | Harvey et al. |
| 2004/0133671 A1 * | 7/2004 | Taniguchi ................... 709/224 |
| 2004/0181607 A1 | 9/2004 | Xu et al. |
| 2006/0265209 A1 * | 11/2006 | Bradford ........................ 704/9 |
| 2007/0005589 A1 * | 1/2007 | Gollapudi ...................... 707/5 |
| 2007/0011151 A1 * | 1/2007 | Hagar et al. ................... 707/4 |
| 2008/0281915 A1 * | 11/2008 | Elad et al. ................... 709/204 |

FOREIGN PATENT DOCUMENTS

| WO | 02/10967 A2 | 2/2002 |
|---|---|---|
| WO | 2006/068365 A1 | 6/2006 |

* cited by examiner

*Primary Examiner*—Hung T Vy
(74) *Attorney, Agent, or Firm*—Lerner, David, Littenberg, Krumholz & Mentlik, LLP (57) ABSTRACT

A method of storing semantically similar documents on proximally located peers in a structured peer to peer overlay network, where each peer is assigned a unique identifier and each document includes one or more words belonging to at least one hierarchical structured collection of words. A method of searching and retrieving documents, corresponding to a search query, from a structured peer to peer overlay network is also provided.

25 Claims, 4 Drawing Sheets

METHOD FOR SEMANTIC BASED STORAGE AND RETRIEVAL OF INFORMATION

BACKGROUND OF THE INVENTION

The present invention is directed towards storage and retrieval of information in structured peer to peer (P2P) overlay networks. More particularly, the present invention provides a method for placing semantically similar information on peers which are proximally located in the P2P network and an efficient searching scheme for retrieving desired information from the network.

A peer-to-peer (P2P) network is a distributed network of computers in which there are no dedicated server or client computers. Every computer or node in a P2P network acts either as a server or as a client. Various different architectural configurations are available for creating P2P networks such as, centralized, decentralized unstructured, and decentralized structured, etc. Examples of earlier generation centralized and decentralized unstructured P2P networks comprise Napster and Gnutella respectively. Centralized P2P networks suffer from drawbacks such as a central repository maintaining indexes of all documents stored on the network resulting in a single point of failure. Decentralized unstructured P2P networks usually employ broadcasting of queries in the network, thereby limiting scalability of the network.

Decentralized structured P2P networks have been developed to address the limitations associated with the earlier generation networks. Examples of structured P2P networks comprise Chord developed at the Massachusetts Institute of Technology, Content Addressable Networks (CAN) [Ratnasamy et al, 2001], Tapestry [Zhao et al, 2001] and Pastry [Rowstron and Druschel, 2001]. Structured P2P networks are largely scalable in comparison to unstructured P2P networks.

Structured P2P networks (such as Chord, CAN etc.) employ an overlay architecture scheme providing a level of indirection over traditional networking addresses such as Internet Protocol (IP) addresses and are usually used for building distributed hash tables (DHT). In a typical Chord based P2P network, an identifier of each peer computer (e.g, the IP address of the computer) is hashed to generate a unique peer identifier. The hashed peers are arranged in the form of a uni-dimensional ring often referred to as a Chord ring. Resources such as files stored on the peers are also hashed to generate resource identifiers. Each resource is then placed in the Chord ring at a peer whose unique identifier is closest to its hash identifier. Each peer in the Chord ring maintains partial routing information and relies on successive forwarding by other peers to efficiently route user queries. Although such structured P2P network architectural schemes have proven to be highly scalable, there is need for P2P networks that support efficient multi-keyword or semantic based searches.

Recently developed P2P information retrieval systems such as pSearch [Tang et al, 2002] and GridVine [Aberer et al, 2004] address some of the limitations of the structured P2P networks (such as Chord, CAN etc.).

In the pSearch information retrieval system, documents stored in the network as well as queries are represented as vectors by using vector space model (VSM) or latent semantic indexing (LSI) schemes. In accordance with one approach, the similarity between a document and a query is assessed by using cosine of the angle between the respective vectors. In pSearch systems employing VSM scheme, m-most heavy weight document terms are identified, hashed and routed using a CAN overlay architecture. To process a semantic search query having t-keywords, the query is routed t-times using individual keywords and semantically similar documents are retrieved from selected zones in the CAN. In pSearch systems employing LSI scheme, the document vectors are dimensionally reduced by using singular value decomposition and the resulting vector is used as a DHT key for routing in a CAN. Such an approach enables placing semantically similar documents at proximally located zones in the CAN and a query is resolved by routing its vector as a DHT key in the CAN. The query upon reaching the relevant zone, floods the request to proximally located zones (with a maximum pre-computed radius) in order to retrieve semantically similar documents. Usage of VSM based pSearch systems requires a thorough knowledge of vector dimensions of peer resources and queries whereas LSI based pSearch systems inhibit dynamic schema evolution in P2P networks, thereby limiting the applicability of pSearch systems.

GridVine builds upon the P-Grid [Aberer, 2001] structured overlay network for supporting semantic based searches in a P2P network. In a GridVine network statements, describing information stored in the P2P network, are represented by using resource description framework (RDF) and the RDF triples, each consisting of a subject, a predicate and an object, and are published in the P-Grid overlay network. Each query is expressed by using resource description framework query language (RDQL) and is resolved by routing query variables to the GridVine overlay network. GridVine also supports dynamic schema evolution in the P2P network. As the frequency of RDF triples is generally non-uniform in nature, load-imbalances are created in the GridVine architecture leading to scalability issues.

Hence, there is need for a method of information storage and retrieval in structured P2P overlay networks which is scalable and efficient in terms of time taken to retrieve information corresponding to a search query comprising a set of keywords.

SUMMARY OF THE INVENTION

The invention provides a method of storing semantically similar documents on proximally located peers in a structured peer to peer overlay network, each peer being assigned a unique identifier, each document comprising one or more words belonging to at least one hierarchical structured collection of words, the hierarchical structure comprising a plurality of branches, the branches being sequentially numbered. The method comprises the steps of: extracting a predetermined number of words from a document, belonging to a set of documents; computing a concept similarity (CS) metrics between at least one pair of the extracted words; computing a score S(T) for the extracted set of words by using the computed CS metrics, branch numbers to which the extracted words belong and the total number of branches in the hierarchical structured collection of words; computing a hash value hash(T) for the document by using the computed S(T); routing the computed hash(T) over the structured peer to peer overlay network; storing hash(T) at a first successor peer node whose unique identifier is greater than hash(T); and repeating the method steps for each document belonging to the set of documents.

In an embodiment of the present invention, the unique identifiers assigned to each peer range from 0 to $(2^n-1)$, where the structured peer to peer overlay network is a n bit Chord ring and each peer maintains at least one of a successor table, a predecessor table and a finger table. In an embodiment, each document comprises one or more words belonging to at least one hierarchical tree structured taxonomy of words, the number of words extracted from the document is greater than one and they are arranged in a descending order of their importance.

In another embodiment of the present invention, the CS metrics computed for a pair of words is based on the location of the words in the hierarchical structured collection of words and is computed with respect to every pair of the extracted words. The value of S(T) ranges between 0 and 1. In an embodiment, hash(T) is computed by multiplying S(T) with (2n−1), where the structured peer to peer overlay network is a n bit Chord ring and the value of hash(T) ranges from 0 to (2n−1). In yet another embodiment, the step of storing a pointer pointing to the address of the document in the structured peer to peer overlay network and the hash(T) at a first successor peer node whose unique identifier is greater than hash(T).

The invention also provides a method of searching and retrieving documents corresponding to a search query, from a structured peer to peer overlay network, each peer being assigned a unique identifier, each document being assigned a document identifier key, each search query comprising one or more words belonging to at least one hierarchical structured collection of words, the hierarchical structure comprising a plurality of branches, the branches being sequentially numbered, the method comprising the steps of: entering a query comprising a predetermined number of keywords; computing a concept similarity (CS) metrics between at least one pair of the keywords; computing a first score $S(T_1)$ for a first set of the keywords by using the computed CS metrics, branch numbers to which the first set of keywords belong and the total number of branches in the hierarchical structured collection of words; computing a second score $S(T_2)$ for a second set of the keywords by using the computed CS metrics, branch numbers to which the second set of keywords belong and the total number of branches in the hierarchical structured collection of words; computing a first hash value $hash(T_1)$ by using the computed $S(T_1)$; computing a second hash value $hash(T_2)$ by using the computed $S(T_2)$; computing a radius of search by obtaining the difference between the values of $hash(T_1)$ and $hash(T_2)$; computing a distributed hash table (DHT) key by using the computed radius of search and at least one of the computed hash values; routing the computed DHT key over the structured peer to peer overlay network; extracting all document identification keys stored at a first peer whose unique identifier is greater than the DHT key; and retrieving the documents corresponding to the extracted document identification keys.

In an embodiment of the present invention, the method of searching and retrieving documents corresponding to a search query, from a structured peer to peer overlay network further comprising the steps of: routing the DHT key to an immediate successor peer; determining if the unique identifier of the peer is less than or equal to a value obtained by summing the computed radius of search and at least one of the computed hash values; extracting all document identification keys stored at the peer if the unique identifier of the peer is less than or equal to the value obtained by summing the computed radius of search and at least one of the computed hash values; retrieving the documents corresponding to the extracted document identification keys; and ranking the retrieved documents if the unique identifier of the peer is greater than the value obtained by summing the computed radius of search and at least one of the computed hash values.

In various embodiments of the present invention, the method of storing semantically similar documents on proximally located peers in a structured peer to peer overlay network searching and retrieving documents corresponding to a search query, from the structured peer to peer overlay network may be provided as a computer program product having computer readable instructions embodied therein.

BRIEF DESCRIPTION OF THE DRAWINGS

The present invention is described by way of embodiments illustrated in the accompanying drawings wherein.

DETAILED DESCRIPTION

A method for placing semantically similar information on peers which are proximally located in a structured P2P overlay network and an efficient searching scheme for retrieving desired information from the network are described herein. The invention provides a hashing scheme that captures semantic similarity among documents. The invention also provides a method for efficiently searching for semantically similar documents stored in the P2P network. The method of the invention may be provided on a computer readable medium.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
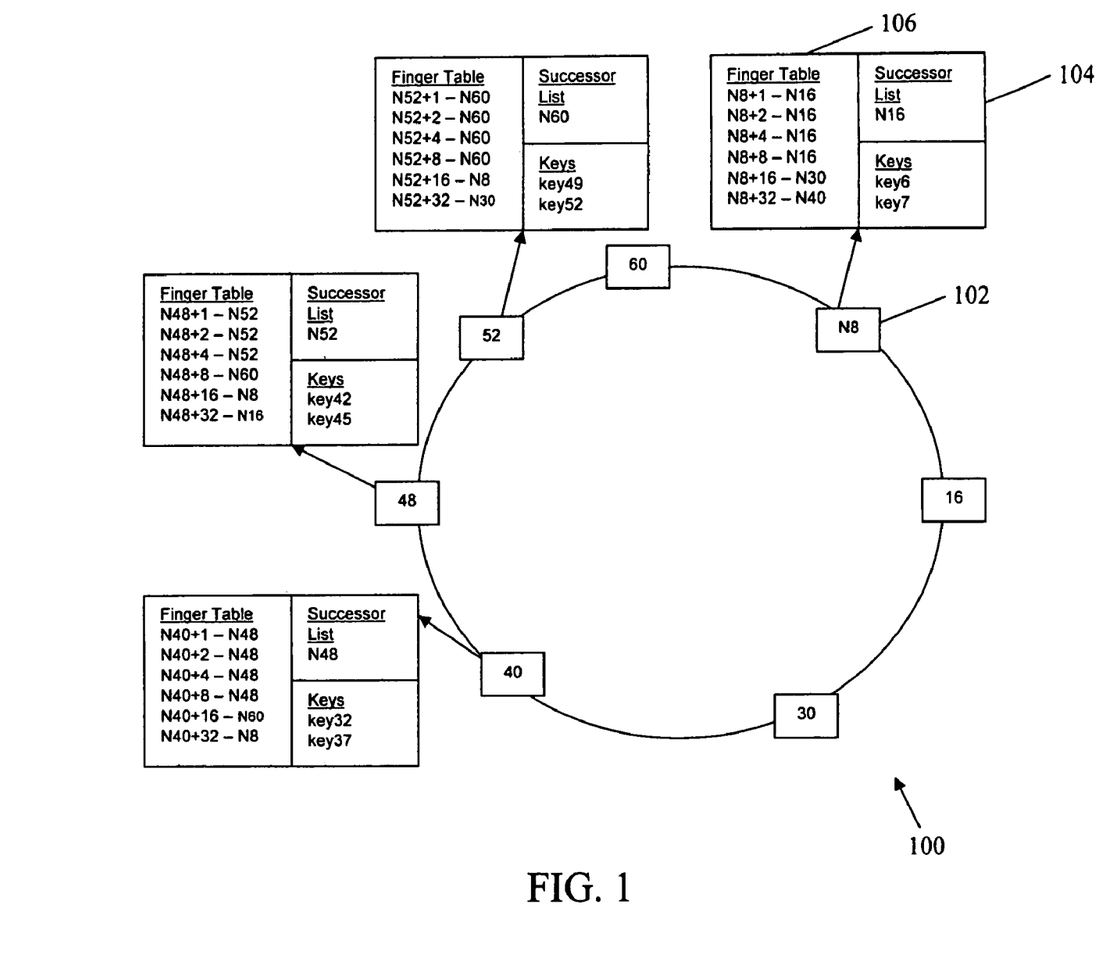
FIG. 1 illustrates a typical one dimensional Chord ring using 6-bit identifiers.

FIG. 1 illustrates a typical one-dimensional 6-bit Chord ring 100 with seven peer nodes. Each peer node 102 is assigned a six bit unique identifier and all the peer nodes are arranged in the logical ring 100 in an ascending order of the unique identifiers. Chord ring 100 may comprise a maximum of $2^6$ nodes which is equal to 64 peer nodes. The unique identifiers of the peer nodes in Chord ring 100 range from 0 to $(2^6−1)$, i.e., from 0 to 63, depending on the number of peer nodes included in the Chord ring 100. In various embodiments of the present invention, standard hashing algorithms such as the SHA-1 algorithm is used for generating unique identifiers for the peer nodes. In an embodiment of the present invention, unique identifiers for the peer nodes may be generated by hashing the IP addresses of the nodes. In other embodiments, any characteristic number of the peer nodes may be hashed to generate unique identifiers.

Each peer node 102 in chord ring 100 maintains a set of tables for efficient routing in the network. The tables maintained by each node 102 comprise a successor table 104 and a finger table 106. Successor table 104 stores identifiers of one or more successor nodes of node 102. Finger table 106 maintains pointers to peer nodes in the network at intervals that increase in powers of 2. Maintenance of finger tables by peer nodes enables quick and efficient routing in the network. In various embodiments of the present invention, each node 102 also maintains a predecessor table for storing an identifier of an immediate predecessor node of the respective node in the network.

In an embodiment of the present invention, a 160-bit Chord ring comprising a maximum of $2^{160}$ peer nodes is employed. The unique identifiers of the peer nodes in the ring range from 0 to $2^{160}-1$. The peer nodes are arranged in a manner similar to that illustrated in FIG. 1 and each node maintains successor, predecessor and finger tables to enable efficient routing.

Figure 2:
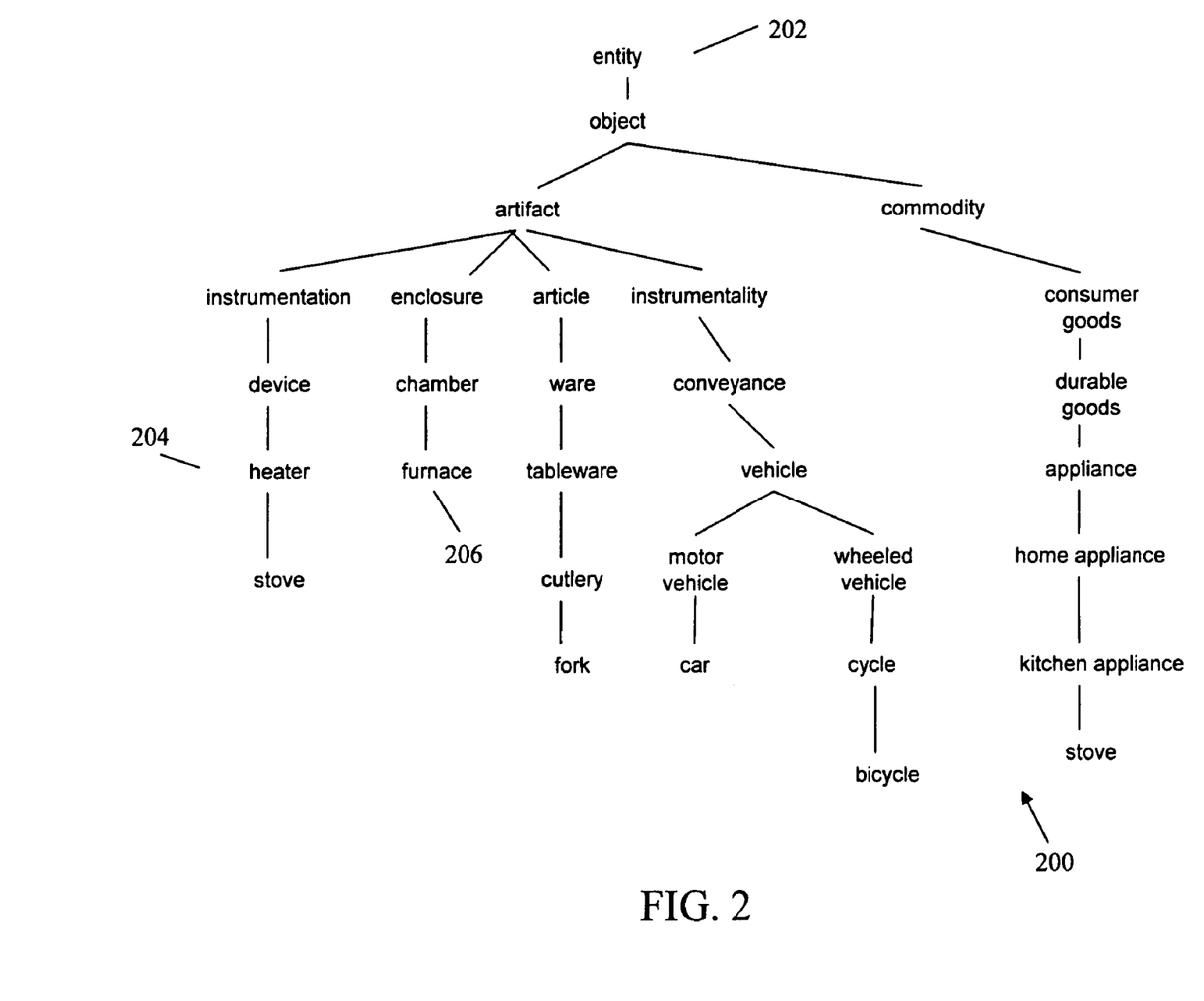
FIG. 2 illustrates an excerpt from the WordNet® lexical database.

In various embodiments of the present invention, documents stored at the peer nodes contain words which belong to at least one commonly known taxonomy such as WordNet®. FIG. 2 illustrates an excerpt from the WordNet® lexical database. The taxonomy illustrated in FIG. 2 is represented in the form of a hierarchical tree 200 containing a root term 202 which subtends various branches. Each branch contains a set of terms such as 'heater' 204 and 'furnace' 206, etc. In various embodiments of the present invention, the branches subtended by the root term 202 are numbered sequentially either from left to right or from right to left and the total number of branches subtended is determined.

Figure 3:
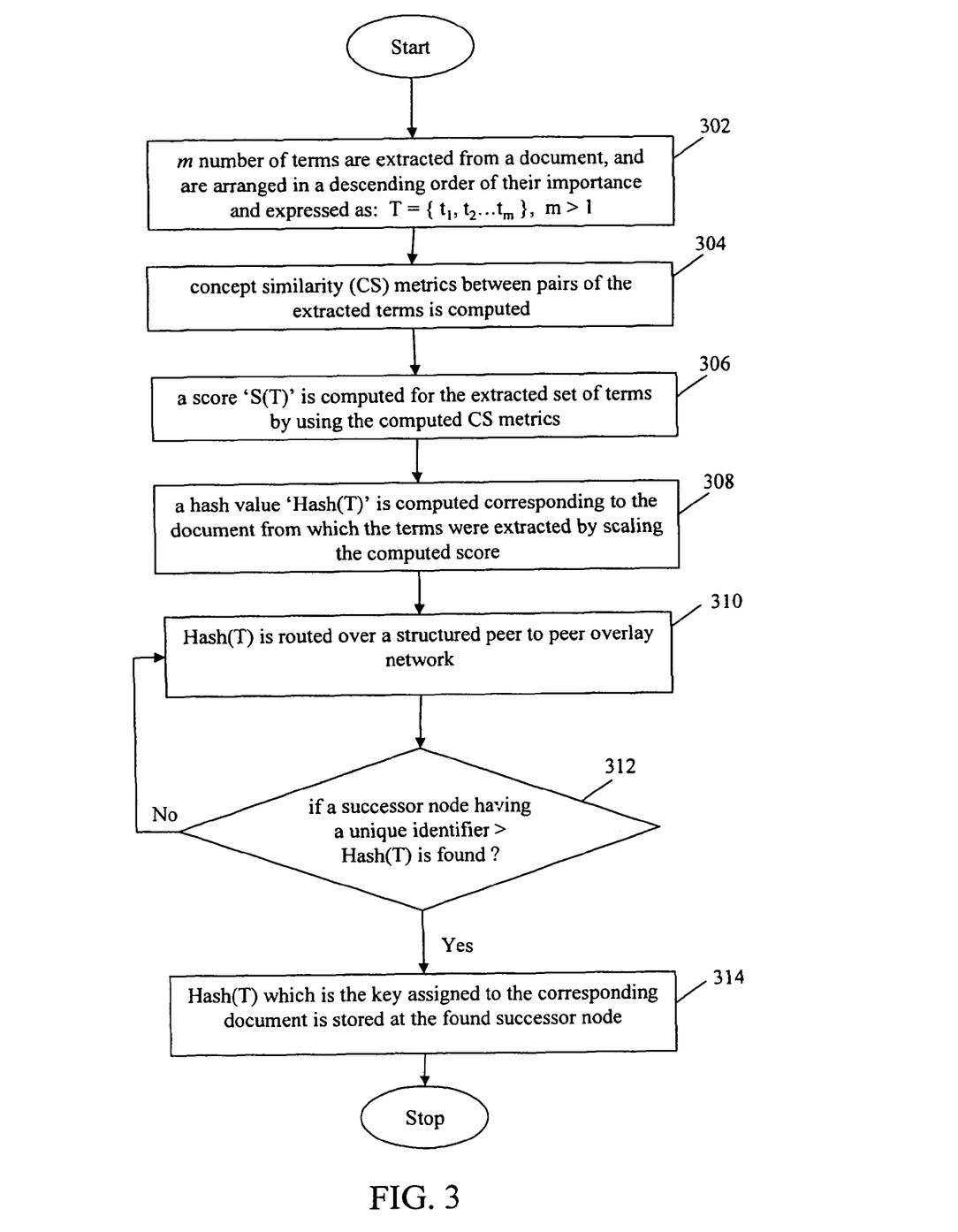
FIG. 3 illustrates a method of storing semantically similar documents at peer nodes which are proximally located in a structured peer to peer overlay network.

FIG. 3 illustrates a method of storing semantically similar documents at peer nodes which are proximally located in a structured peer to peer overlay network. At step 302 'm' number of terms are extracted from a document, belonging to a set of documents, wherein m is a predetermined number which is greater than 1. The extracted terms are arranged in a descending order of their importance. In various embodiments of the present invention, any of the text mining algorithms commonly known in the art may be used for extracting terms from a document and arranging them in order of importance. In an embodiment, term frequency-inverse document frequency (TFIDF) method, commonly known in the art, may be used for assigning a weight to every term in a document. The assigned weight is used to evaluate the importance of a term appearing in the document. 'Term frequency' in the TFIDF method is arrived at by determining the number of times the term appears in the document. 'Inverse document frequency' is a measure of the importance of the term which is obtained by dividing the number of documents in the set by the number of documents containing the term, and then taking the logarithm of the obtained quotient. By using the TFIDF method, a term having a high term frequency in a document and a low document frequency in the set of documents is assigned a high weight. Thereby, the TFIDF method ensures filtering out of common terms appearing in all documents.

The extracted terms arranged in order of importance may be expressed as:

$$T=\{t_1, t_2 \ldots t_m\}, m>1 \qquad (1)$$

At step 304 a concept similarity (CS) metrics between pairs of the extracted terms is computed. In various embodiments of the present invention, CS metrics may be computed between a predetermined number of pairs of the extracted terms or between every pair of the extracted terms. Usage of CS metric for determining semantic relationships between document terms is commonly known in the art. In an embodiment the CS metric between two terms $t_1$ and $t_2$ may be computed as:

$$CS(t_1, t_2) = e^{-\alpha l} * (e^{\beta h} - e^{-\beta h})/(e^{\beta h} + e^{-\beta h}) \qquad (2)$$

where:
l denotes shortest path length between $t_1$ and $t_2$;
h denotes depth of the direct common ancestor that subsumes $t_1$ and $t_2$; and
α and β are tunable parameters whose values may range from 0 to 1.

With reference to FIG. 2, in an exemplary embodiment, if term $t_1$ is 'heater' 204 and term $t_2$ is 'furnace' 206, the value of l which is the shortest path length between term $t_1$ and term $t_2$ is six. Further, the value of h which is the depth of the direct common ancestor that subsumes term $t_1$ and term $t_2$ is three. In accordance with the CS method for determining semantic relationships, the extent of similarity between two terms increases with a decrease in the shortest path length l and an increase in the depth of common ancestor d.

At step 306 a score S(T) is computed for the extracted set of terms as:

$$S(T)=[1/(m-1)]*[\Sigma_{t_i \in T}(\text{Max}_{t_j \in T, i \neq j} CS(t_i, t_j))*(\text{branch}(t_i)/TB)], S(T) \in [0, 1] \qquad (3)$$

where:
'branch($t_i$)' denotes the number of the branch to which the term $t_i$ belongs; and
'TB' denotes the total number of branches in the hierarchical tree to which the set of terms $T=\{t_1, t_2 \ldots t_m\}$ belongs. In various embodiments of the present invention, when semantic relationship between two terms is determined by using CS metrics as depicted in equation (2), the equation may generate the same CS metric for any two terms even though each of the terms are separated widely in the hierarchical tree to which they belong. In order to distinguish between such terms which are widely separated in the hierarchical tree but generate the same CS metric, the term (branch($t_i$)/TB) is included in equation (3) for computing S(T). Accordingly a score S(T) is assigned to each document by using the equations 1 to 3. In various embodiments of the invention, the value of S(T) ranges between 0 and 1.

At step 308 a hash value 'hash(T)' is computed with respect to each document by using the following equation:

$$\text{hash}(T)=S(T)*(2^{160}-1) \qquad (4)$$

Hash(T) is a unique ID or key which is assigned to each document. The value of hash(T) ranges from 0 to $2^{160}-1$.

In equation (4) the score S(T) is scaled by the multiplication factor $(2^{160}-1)$. The multiplication factor is so chosen because the document being assigned the score is required to be stored on a peer node in a Chord ring that may have unique identifiers ranging between of 0 to $(2^{160}-1)$. In various embodiments of the invention, a suitable multiplication factor may be used to obtain hash(T) for structured peer to peer overlay networks having different dimensions.

At step 310 the computed hash(T) is routed over a structured peer to peer overlay network, which in one embodiment is a 160 bit Chord ring where each peer node is assigned a unique identifier ranging between 0 to $2^{160}-1$. In various embodiments of the present invention, the number of peer nodes in the Chord ring is less than the maximum permissible number i.e. $2^{160}$.

At step 312 it is determined if a successor peer node whose unique identifier is greater than hash(T) is found. If a successor peer node whose unique identifier is greater than hash(T) is found, then at step 314, hash(T) which is the key assigned to the corresponding document is stored at the found successor peer node. If a successor peer node whose unique identifier is greater than hash(T) is not found step 310-314 is repeated.

In various embodiments of the present invention, a pointer pointing to the actual address of the document in the peer to peer network is also stored along with the key on the found successor node. Hence, by using the method steps illustrated in FIG. 2, it is ensured that keys corresponding to semantically similar documents are stored on peer nodes which are proximally located. This facilitates efficient and quick searching of semantically similar documents stored in a peer to peer network.

Figure 4:
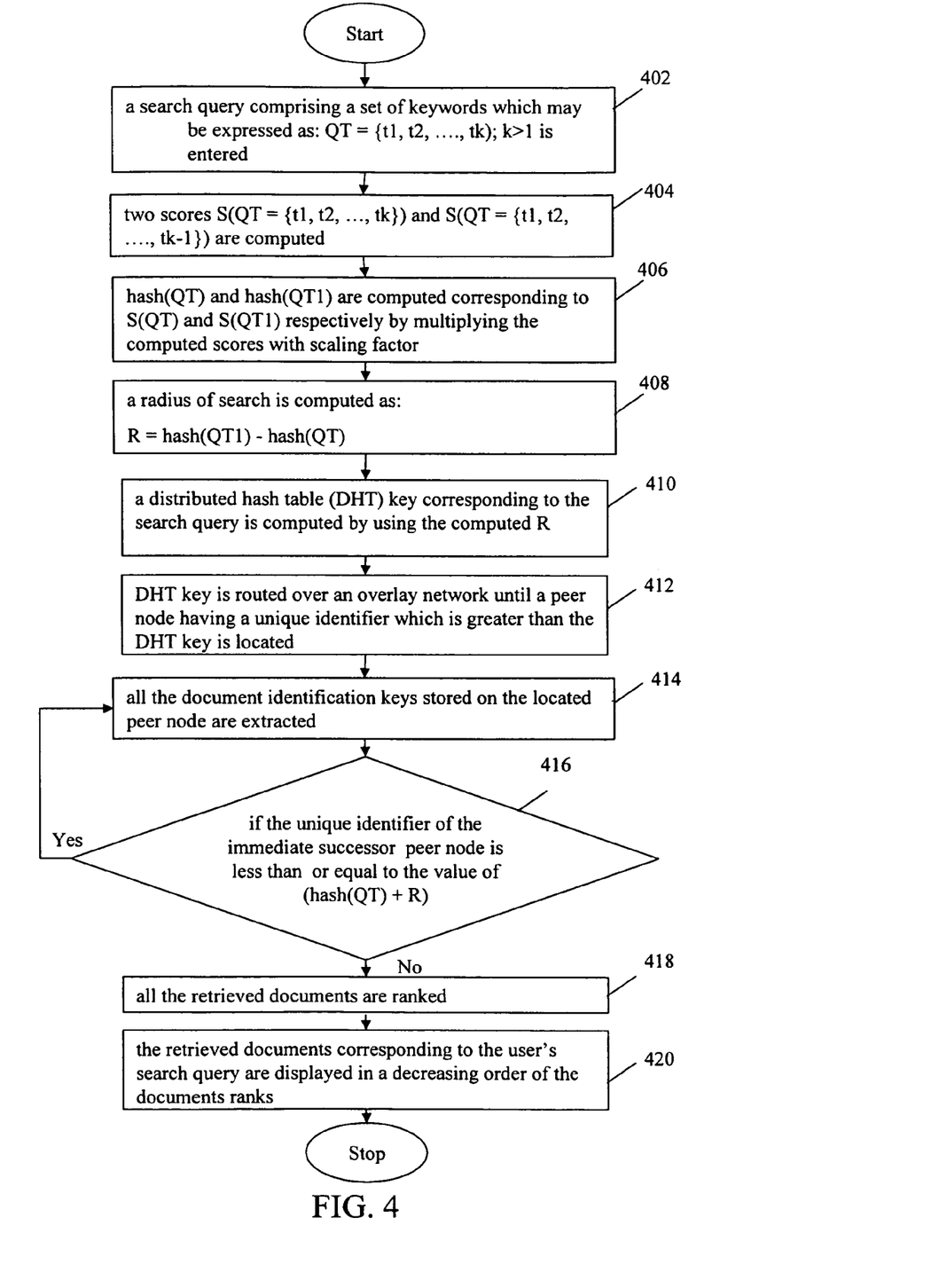
FIG. 4 illustrates a method of search and retrieval of documents corresponding to a search query, from a structured peer to peer overlay network.

FIG. 4 illustrates a method of search and retrieval of documents corresponding to a search query, from a structured peer to peer overlay network.

At step 402 a user enters a search query comprising a set of keywords which may be expressed as:

$$QT=\{t_1, t_2 \ldots, t_k\}; k>1 \tag{5}$$

Equation (5) depicts a query comprising k number of keywords where k is a number greater than 1. In different embodiments, the keywords may be arranged in order of importance specified by the user or in the order in which they are entered by the user.

At step 404 two scores $S(QT)$ and $S(QT_1)$ are computed by using equations (2) and (3). The score $S(QT_1)$ is computed corresponding to all k keywords and may be expressed as $S(QT=\{t_1, t_2, \ldots, t_k\})$. The score $S(QT_1)$ is computed corresponding to k–1 keywords and may be expressed as $S(QT=\{t_1, t_2, \ldots, t_{k-1}\})$.

At step 406 hash(QT) and hash(QT$_1$) are computed corresponding to $S(QT)$ and $S(QT_1)$ respectively by multiplying the computed scores with a scaling factor $(2^{160}-1)$ as:

$$\text{hash}(QT)=S(QT)*(2^{160}-1) \tag{6}$$

$$\text{hash}(QT_1)=S(QT_1)*(2^{160}-1) \tag{7}$$

At step 408 a radius of search is computed as:

$$R=\text{hash}(QT_1)-\text{hash}(QT) \tag{8}$$

At step 410 the radius of search R is used to compute a distributed hash table (DHT) key corresponding to the search query as:

$$\text{DHT key}=\text{hash}(QT)-R \tag{9}$$

At step 412 the computed DHT key is routed over the overlay network until a peer node having a unique identifier greater than the DHT key is located. Upon locating the relevant peer node at step 414 all the document identification keys stored on the peer node are extracted. By using the extracted document identification keys and the pointers to the actual location of the documents, said documents are retrieved from the peer to peer network. Next, the DHT key is routed to an immediate successor peer node.

At step 416 it is determined if the unique identifier of the immediate successor peer node is less than or equal to the value of (hash(QT)+R). If it is determined that the unique identifier of the immediate successor peer node is less than or equal to the value of (hash(QT)+R) steps 414 and 416 are repeated. If it is determined that the unique identifier of the immediate successor peer node is not less than or equal to the value of (hash(QT)+R) then at step 418 all documents retrieved at step 414 are ranked. The documents may be ranked by assigning weights to the terms used in the document by using TFIDF method and then aggregating the assigned weights corresponding to each document. In other embodiments of the present invention, various other methods of ranking search results commonly known in the art may be used to rank the retrieved documents.

At step 420 the retrieved documents corresponding to the user's search query are displayed in a decreasing order of the documents ranks.

Hence, the present invention provides a method for placing semantically similar information on peers which are proximally located in a structured P2P overlay network and a searching scheme for retrieving desired information from the network. The present invention discloses a semantic hashing scheme that enables placement of semantically similar documents at proximally located peers. The hashing scheme disclosed herein utilizes the concept similarity inherent in a hierarchical taxonomy structure of document terms. The present invention, thereby provides a scalable and efficient solution for information retrieval in structured P2P networks.

While the exemplary embodiments of the present invention are described and illustrated herein, it will be appreciated that they are merely illustrative. It will be understood by those skilled in the art that various changes in form and detail may be made therein without departing from or offending the spirit and scope of the invention as defined by the appended claims.

The invention claimed is:

1. A method of storing semantically similar documents on proximally located peer in a structured peer to peer overlay network, each peer being assigned a unique identifier, each document comprising one or more words belonging to at least one hierarchical structured collection of words, the hierarchical structure comprising a plurality of branches, the branches being sequentially numbered, the method comprising:
   a. extracting a predetermined number of words from a document, belonging to a set of documents;
   b. computing a concept similarity (CS) metrics between at least one pair of the extracted words;
   c. computing a score S(T) for the extracted set of words by using the computed CS metrics, branch numbers to which the extracted words belong and the total number of branches in the hierarchical structured collection of words;
   d. computing a hash value hash(T) for the document by using the computed S(T);
   e. routing the computed hash(T) over the structured peer to peer overlay network;
   f. storing hash(T) at a first successor peer node whose unique identifier is greater than hash(T); and
   g. repeating steps a to f for each document belonging to the set of documents.

2. The method as claimed in claim 1, wherein the unique identifiers assigned to each peer range from 0 to $(2^n-1)$, where the structured peer to peer overlay network is a n bit Chord ring.

3. The method as claimed in claim 1, wherein each peer maintains at least one of a successor table, a predecessor table and a finger table.

4. The method as claimed in claim 1, wherein each document comprises one or more words belonging to at least one hierarchical tree structured taxonomy of words.

5. The method as claimed in claim 1, wherein the number of words extracted from the document is greater than one.

6. The method as claimed in claim 1, wherein the extracted words are arranged in a descending order of their importance.

7. The method as claimed in claim 1, wherein the CS metrics computed for a pair of words is based on the location of the words in the hierarchical structured collection of words.

8. The method as claimed in claim 1, wherein the CS metrics is computed with respect to every pair of the extracted words.

9. The method as claimed in claim 1, wherein the value of S(T) ranges between 0 and 1.

10. The method as claimed in claim 1, wherein hash(T) is computed by multiplying S(T) with $(2^n-1)$, where the structured peer to peer overlay network is a n bit Chord ring.

11. The method as claimed in claim 1, wherein the value of hash(T) ranges from 0 to $(2^n-1)$, where the structured peer to peer overlay network is a n bit Chord ring.

12. The method as claimed in claim 1, further comprising the step of storing a pointer pointing to the address of the document in the structured peer to peer overlay network and the hash(T) at a first successor peer node whose unique identifier is greater than hash(T).

13. A method of searching and retrieving documents corresponding to a search query, from a structured peer to peer overlay network, each peer being assigned a unique identifier, each document being assigned a document identifier key, each search query comprising one or more words belonging to at least one hierarchical structured collection of words, the hierarchical structure comprising a plurality of branches, the branches being sequentially numbered, the method comprising:
   a. entering a query comprising a predetermined number of keywords;
   b. computing a concept similarity (CS) metrics between at least one pair of the keywords;
   c. computing a first score $S(T_1)$ for a first set of the keywords by using the computed CS metrics, branch numbers to which the first set of keywords belong and the total number of branches in the hierarchical structured collection of words;
   d. computing a second score $S(T_2)$ for a second set of the keywords by using the computed CS metrics, branch numbers to which the second set of keywords belong and the total number of branches in the hierarchical structured collection of words;
   e. computing a first hash value $hash(T_1)$ by using the computed $S(T_1)$;
   f. computing a second hash value $hash(T_2)$ by using the computed $S(T_2)$;
   g. computing a radius of search by obtaining the difference between the values of $hash(T_1)$ and $hash(T_2)$;
   h. computing a distributed hash table (DHT) key by using the computed radius of search and at least one of the computed hash values;
   i. routing the computed DHT key over the structured peer to peer overlay network; and
   j. extracting all document identification keys stored at a first peer whose unique identifier is greater than the DHT key; and
   k. retrieving the documents corresponding to the extracted document identification keys.

14. The method as claimed in claim 13, further comprising:
   a. routing the DHT key to an immediate successor peer;
   b. determining if the unique identifier of the peer is less than or equal to a value obtained by summing the computed radius of search and at least one of the computed hash values;
   c. extracting all document identification keys stored at the peer if the unique identifier of the peer is less than or equal to the value obtained by summing the computed radius of search and at least one of the computed hash values;
   d. retrieving the documents corresponding to the extracted document identification keys; and
   e. ranking the retrieved documents if the unique identifier of the peer is greater than the value obtained by summing the computed radius of search and at least one of the computed hash values.

15. The method as claimed in claim 13, wherein each search query comprises one or more keywords belonging to at least one hierarchical tree structured taxonomy of words.

16. The method as claimed in claim 13, wherein the number of keywords in a search query is greater than one.

17. The method as claimed in claim 13, wherein the keywords are arranged in a descending order of their importance.

18. The method as claimed in claim 13, wherein the CS metrics computed for a pair of keywords is based on the location of the words in the hierarchical structured collection of words.

19. The method as claimed in claim 13, wherein the CS metrics is computed with respect to every pair of the keywords.

20. The method as claimed in claim 13, wherein the values of $S(T_1)$ and $S(T_2)$ ranges between 0 and 1.

21. The method as claimed in claim 13, wherein $hash(T_1)$ and $hash(T_2)$ are computed by multiplying $S(T_1)$ and $(ST_2)$ with $(2^n-1)$ respectively, where the structured peer to peer overlay network is a n bit Chord ring.

22. The method as claimed in claim 13, wherein the values of $hash(T_1)$ and $hash(T_2)$ range from 0 to $(2^n-1)$, where the structured peer to peer overlay network is a n bit Chord ring.

23. The computer readable storage medium as claimed in claim 13, wherein the program code further comprises instructions for:
   a. routing the DHT key to an immediate successor peer;
   b. determining if the unique identifier of the peer is less than or equal to a value obtained by summing the computed radius of search and at least one of the computed hash values;
   c. extracting all document identification keys stored at the peer if the unique identifier of the peer is less than or equal to the value obtained by summing the computed radius of search and at least one of the computed hash values;
   d. retrieving the documents corresponding to the extracted document identification keys; and
   e. ranking the retrieved documents if the unique identifier of the peer is greater than the value obtained by summing the computed radius of search and at least one of the computed hash values.

24. A computer program readable storage medium having a computer readable program code embodied therein for storing semantically similar documents on proximally located peer in a structured peer to peer overlay network, each peer being assigned a unique identifier, each document comprising one or more words belonging to at least one hierarchical structured collection of words, the hierarchical structure comprising a plurality of branches, the branches being sequentially numbered, the computer readable program code containing instructions for:
   a. extracting a predetermined number of words from a document, belonging to a set of documents;
   b. computing a concept similarity (CS) metrics between at least one pair of the extracted words;
   c. computing a score S(T) for the extracted set of words by using the computed CS metrics, branch numbers to which the extracted words belong and the total number of branches in the hierarchical structured collection of words;

d. computing a hash value hash(T) for the document by using the computed S(T);
e. routing the computed hash(T) over the structured peer to peer overlay network;
f. storing hash(T) at a first successor peer node whose unique identifier is greater than hash(T); and
g. repeating steps a to f for each document belonging to the set of documents.

25. A computer readable storage medium having a computer readable program code embodied therein for searching and retrieving documents corresponding to a search query, from a structured peer to peer overlay network, each peer being assigned a unique identifier, each document being assigned a document identifier key, each search query comprising one or more words belonging to at least one hierarchical structured collection of words, the hierarchical structure comprising a plurality of branches, the branches being sequentially numbered, the computer readable program code containing instructions for:
  a. entering a query comprising a predetermined number of keywords;
  b. computing a concept similarity (CS) metrics between at least one pair of the keywords;
  c. computing a first score $S(T_1)$ for a first set of the keywords by using the computed CS metrics, branch numbers to which the first set of keywords belong and the total number of branches in the hierarchical structured collection of words;
  d. computing a second score $S(T_2)$ for a second set of the keywords by using the computed CS metrics, branch numbers to which the second set of keywords belong and the total number of branches in the hierarchical structured collection of words;
  e. computing a first hash value $hash(T_1)$ by using the computed $S(T_1)$;
  f. computing a second hash value $hash(T_2)$ by using the computed $S(T_2)$;
  g. computing a radius of search by obtaining the difference between the values of $hash(T_1)$ and $hash(T_2)$;
  h. computing a distributed hash table (DHT) key by using the computed radius of search and at least one of the computed hash values;
  i. routing the computed DHT key over the structured peer to peer overlay network; and
  j. extracting all document identification keys stored at a first peer whose unique identifier is greater than the DHT key; and
  k. retrieving the documents corresponding to the extracted document identification keys.

* * * * *